United States Patent
Balan

(10) Patent No.: US 10,549,635 B1
(45) Date of Patent: Feb. 4, 2020

(54) SAFETY DEVICE FOR PREVENTING FUEL COMBUSTION IN AN AUTOMOBILE COLLISION

(71) Applicant: Alexandru Balan, Hickory, NC (US)

(72) Inventor: Alexandru Balan, Hickory, NC (US)

(73) Assignee: Alexandru Balan, South Gate, CA (US)

( * ) Notice: Subject to any disclaimer, the term of this patent is extended or adjusted under 35 U.S.C. 154(b) by 0 days.

(21) Appl. No.: 16/054,691

(22) Filed: Aug. 3, 2018

(51) Int. Cl.
| | |
|---|---|
| B60K 28/14 | (2006.01) |
| B60K 15/03 | (2006.01) |
| A62C 3/07 | (2006.01) |
| A62C 3/06 | (2006.01) |

(52) U.S. Cl.
CPC .............. B60K 28/14 (2013.01); A62C 3/065 (2013.01); A62C 3/07 (2013.01); B60K 15/03 (2013.01); *B60K 2015/03381* (2013.01)

(58) Field of Classification Search
CPC .......... B60K 28/14; B60K 2015/03381; A62C 3/07; B64D 37/32
See application file for complete search history.

(56) References Cited

U.S. PATENT DOCUMENTS

| | | | | |
|---|---|---|---|---|
| 3,732,668 A | * | 5/1973 | Nichols ................... | B64D 37/32 96/174 |
| 3,797,263 A | * | 3/1974 | Shahir ..................... | F17C 6/00 62/50.1 |
| 4,177,863 A | * | 12/1979 | Simon ..................... | A62C 3/06 169/62 |
| 6,334,490 B1 | * | 1/2002 | Dille ........................ | A62C 3/07 169/14 |
| 7,854,288 B2 | * | 12/2010 | Thompson ............. | A62C 3/065 137/351 |
| 7,896,121 B2 | * | 3/2011 | Thompson ............... | A62C 3/07 137/351 |
| 2007/0074877 A1 | * | 4/2007 | Thompson ............... | A62C 3/07 169/62 |

FOREIGN PATENT DOCUMENTS

| | | | | |
|---|---|---|---|---|
| CA | 2518534 A1 | * | 10/2004 | ............... A62C 3/07 |
| FR | 2706313 A1 | * | 12/1994 | ............... A62C 3/07 |

* cited by examiner

*Primary Examiner* — Ruth Ilan
(74) *Attorney, Agent, or Firm* — Vedder Price P.C.

(57) ABSTRACT

A safety system for an automobile includes a safety device with containing areas in which two premixed liquids are stored during an initial state and which are in fluid communication with a fuel tank. Two valves are mounted internally in the safety device and are closed in the initial state to separate the premixed liquids. The valves are spaced apart at an initial distance, in the initial state, that is greater than a triggered distance, in a triggered state. A cylindrical ring is mounted in the safety device near the valves and has evacuation holes around its periphery that are adjacent to a respective pair of flow-mix channels. The flow-mix channels form a flow-path between the containing areas and a respective evacuation hole via which, in the triggered state, the premixed liquids are combined into a mixed liquid that is subsequently expelled for neutralizing fuel flammability in the fuel tank.

20 Claims, 15 Drawing Sheets

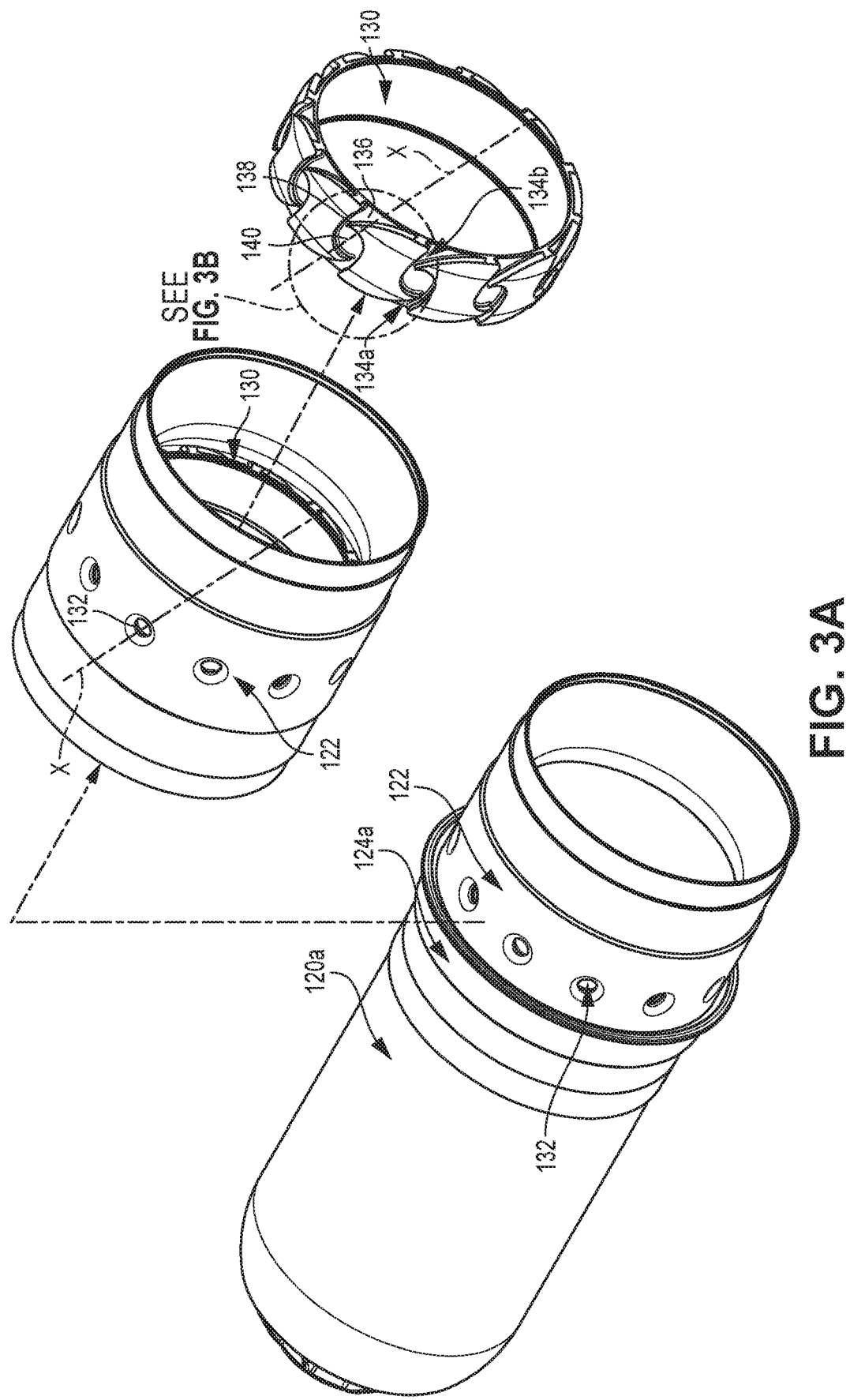

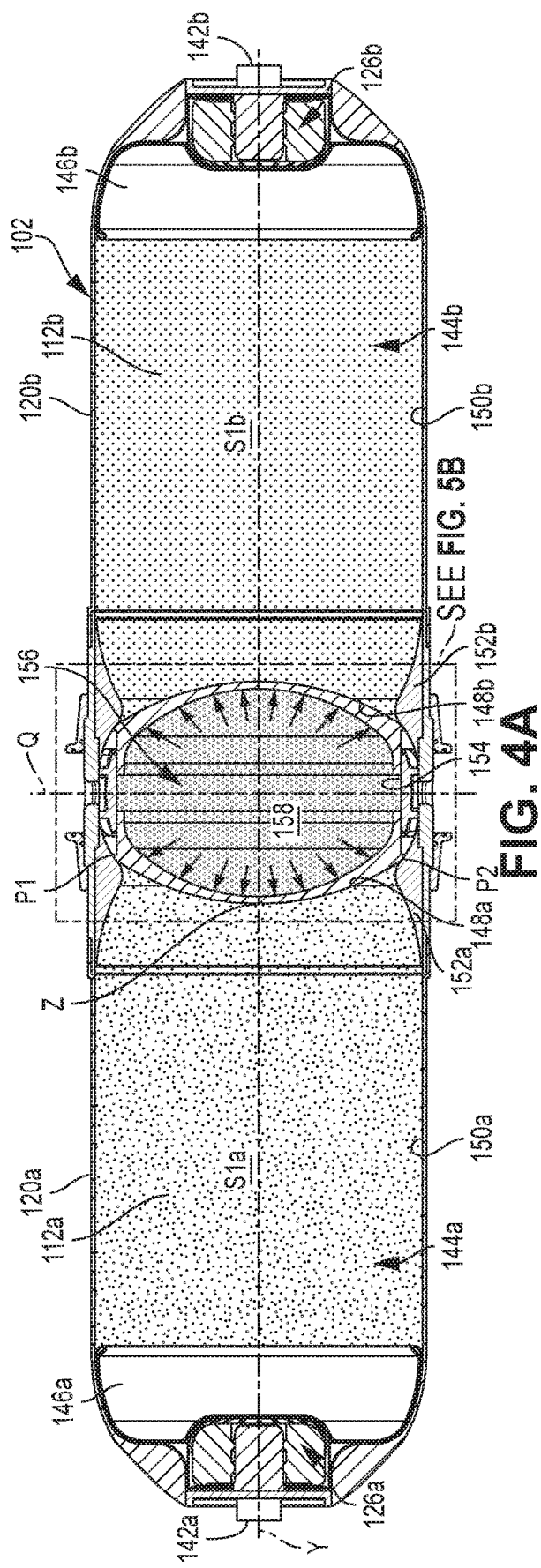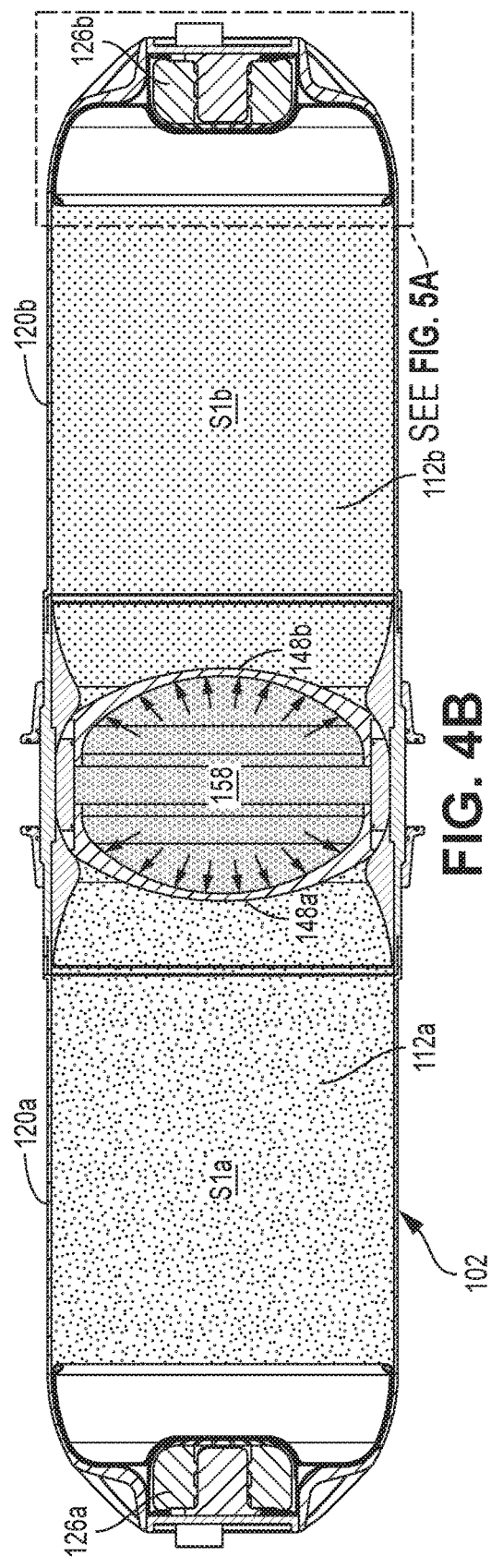

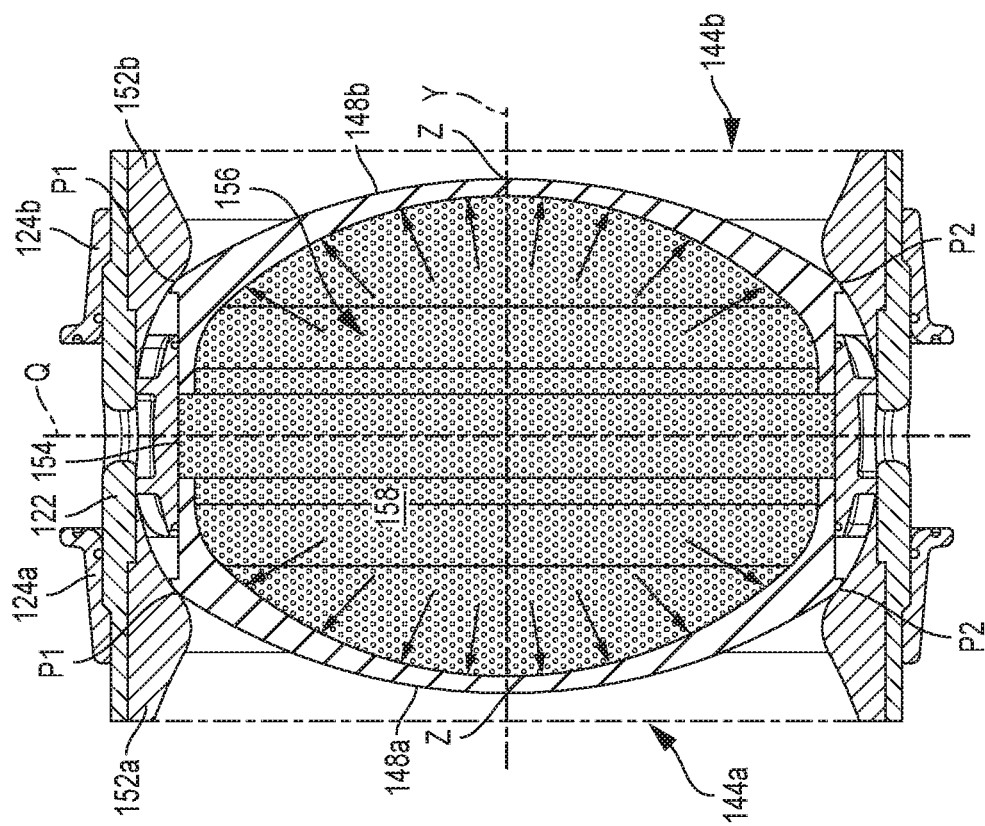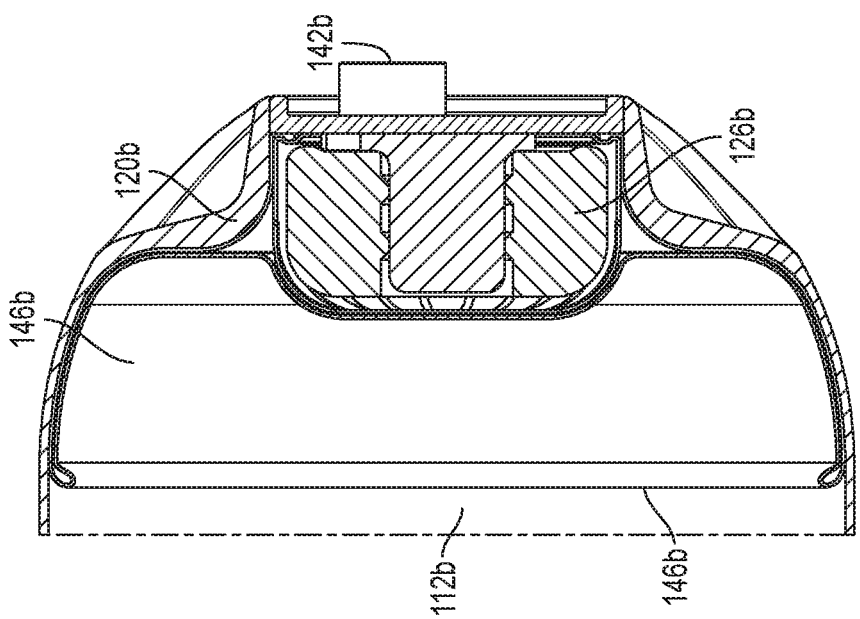
FIG. 5B
FIG. 5A

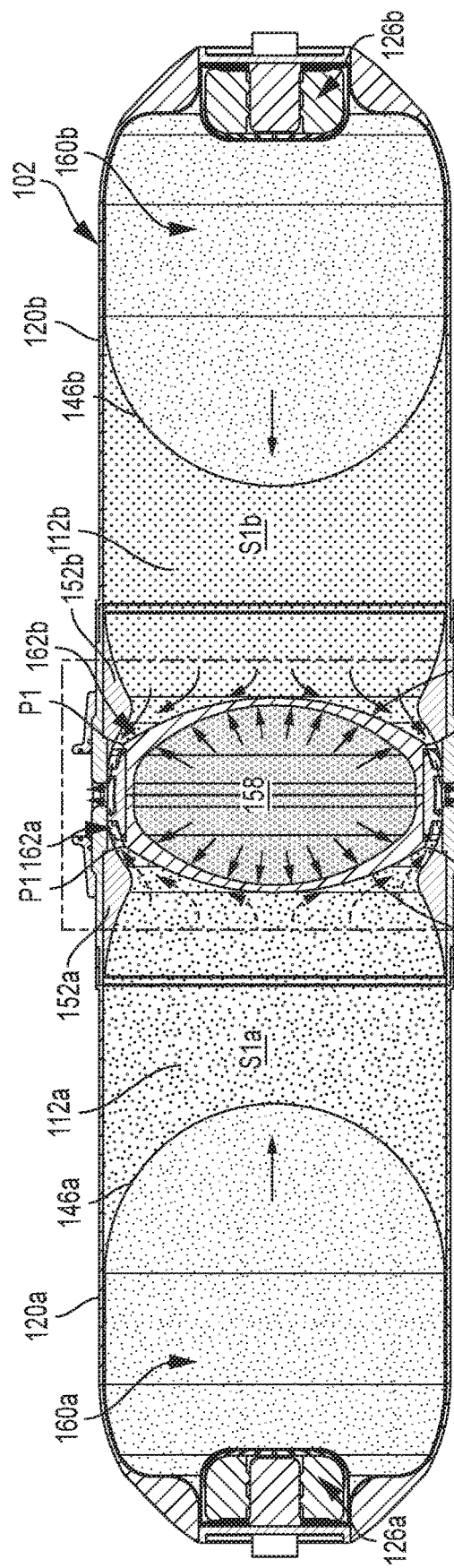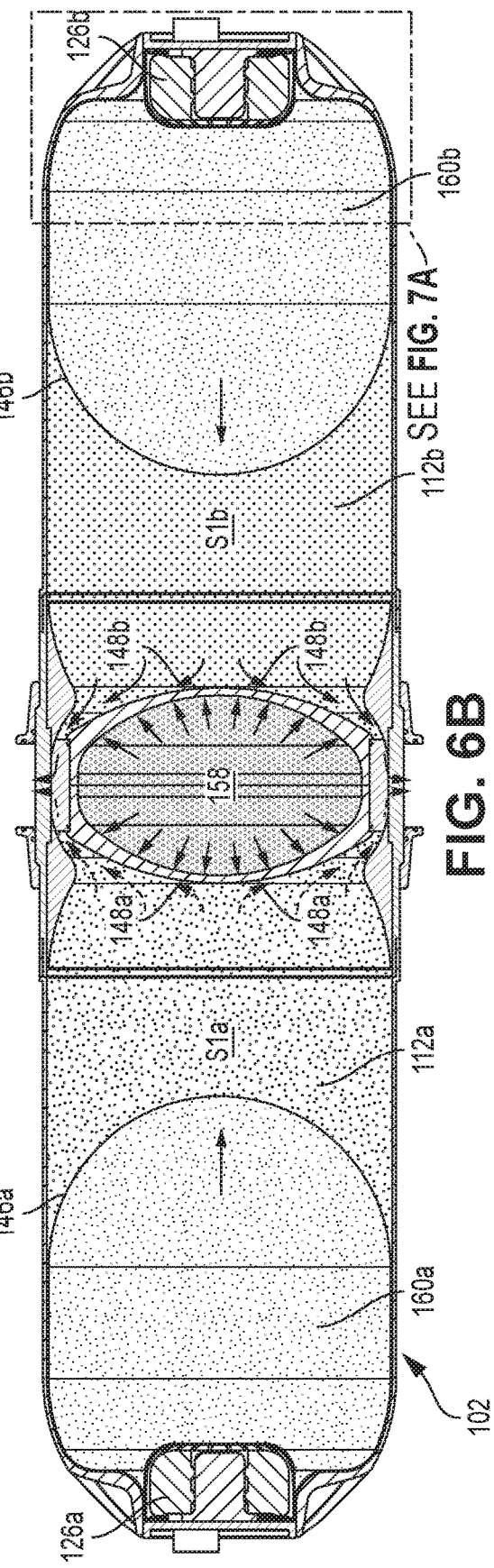

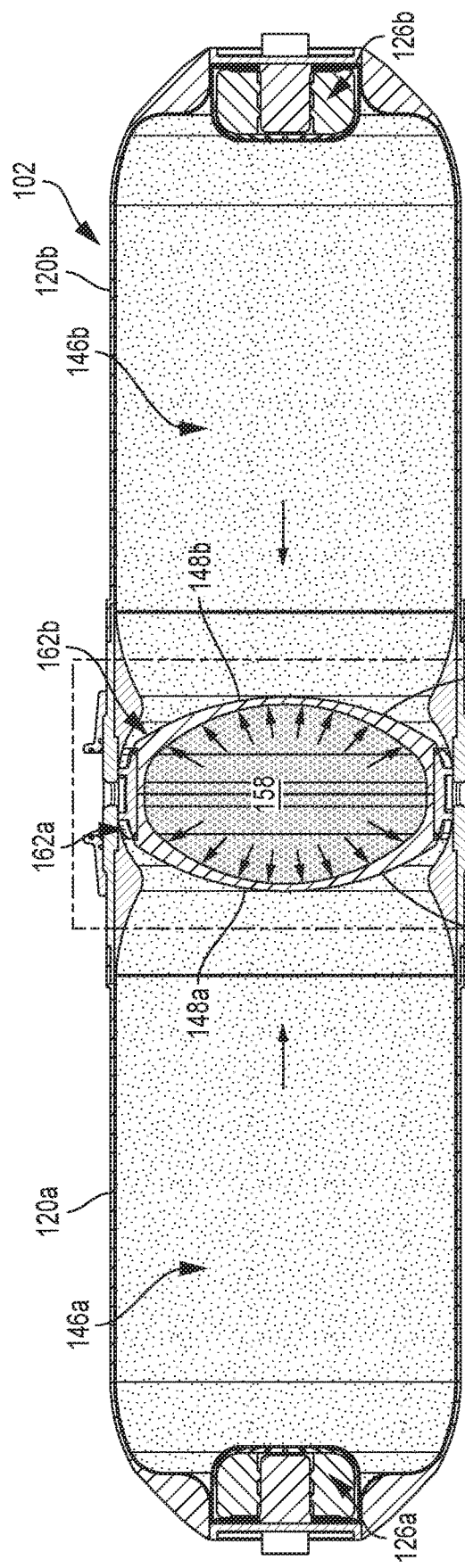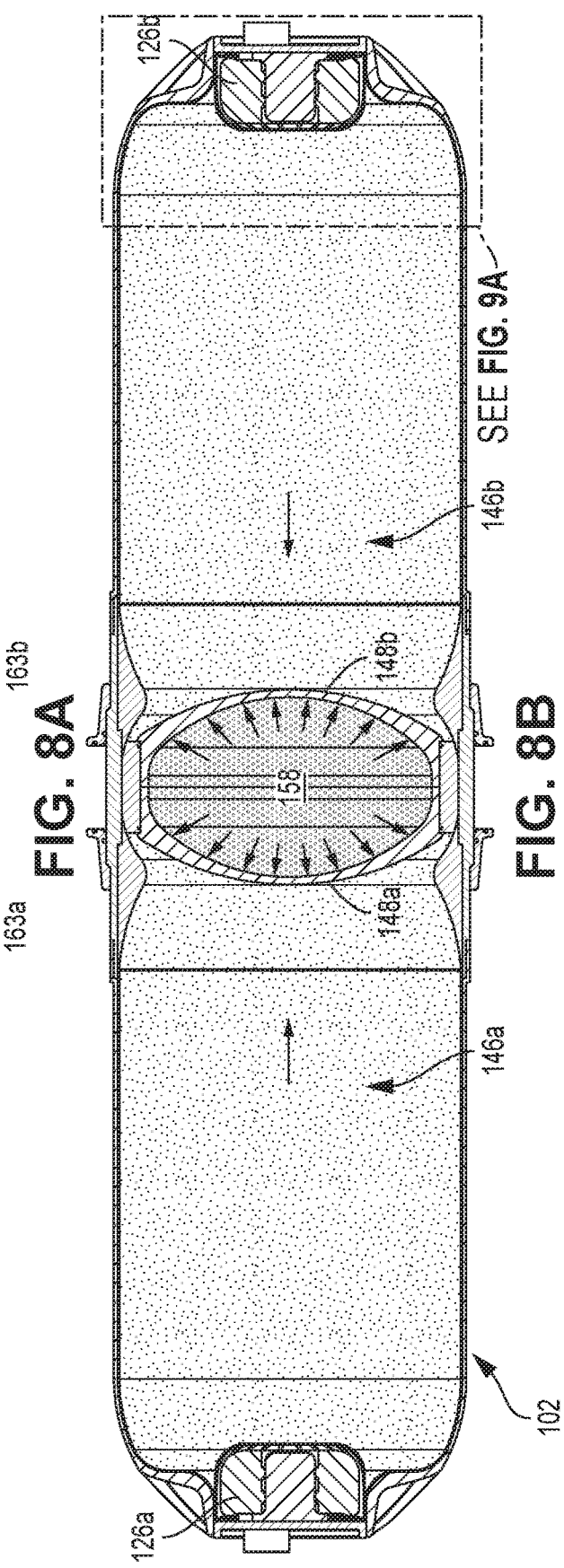

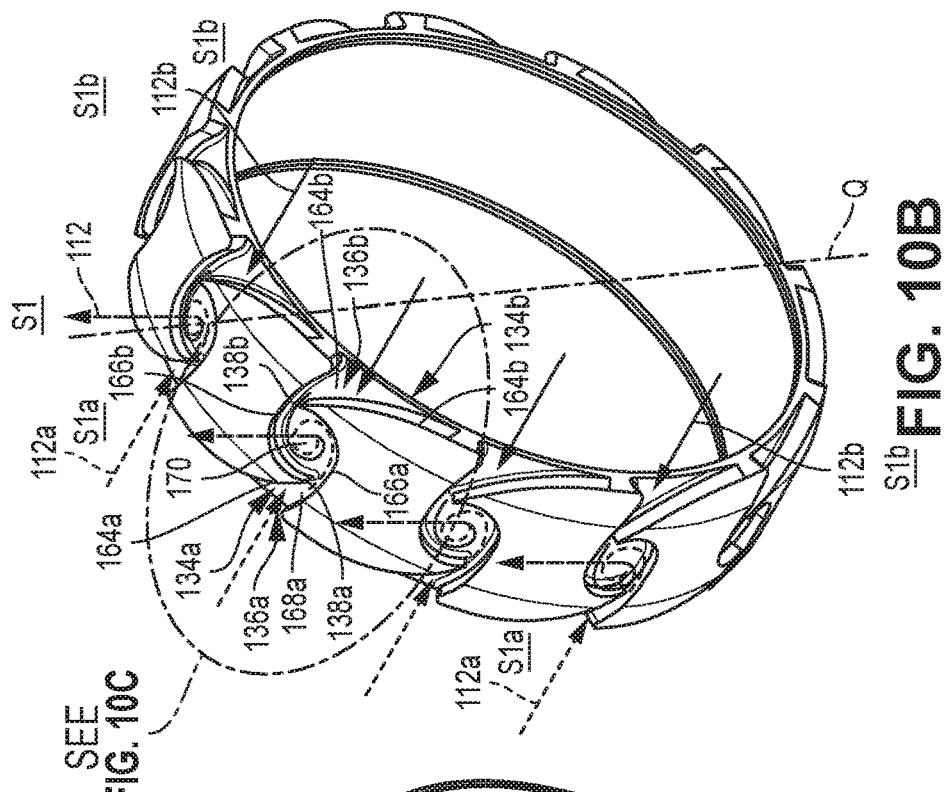
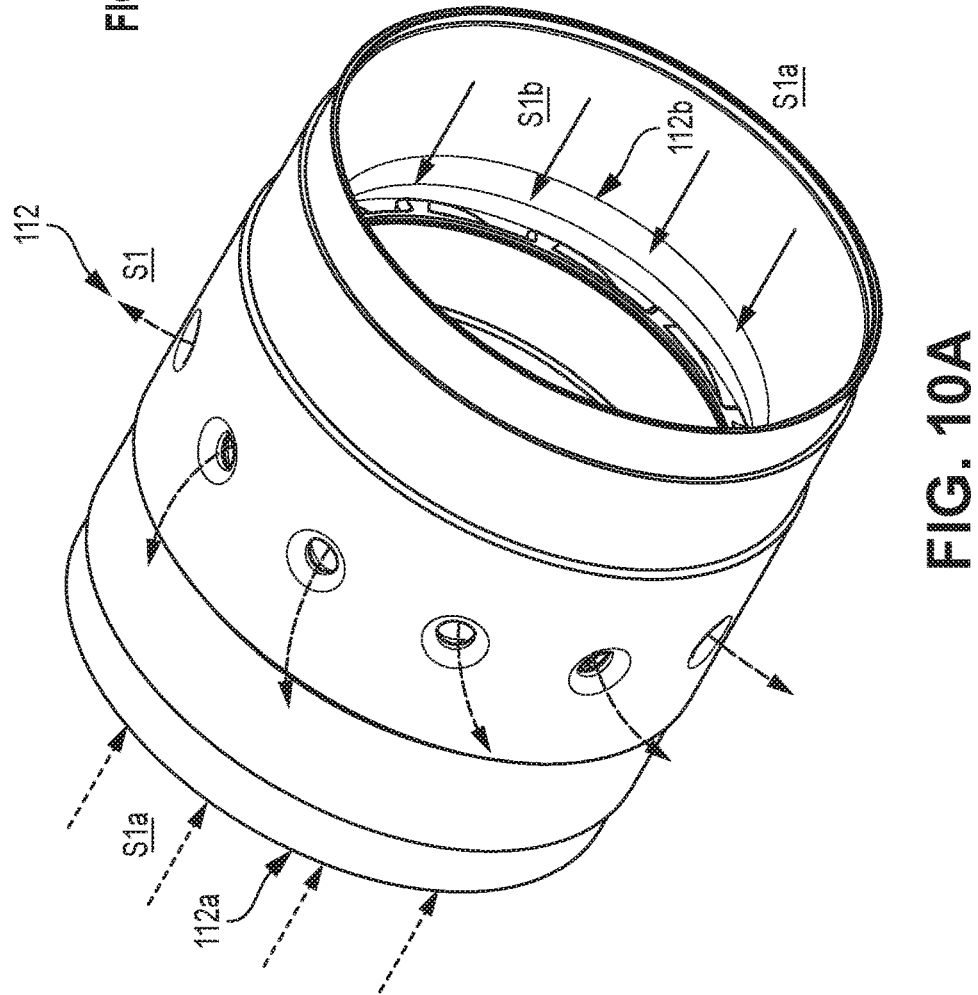

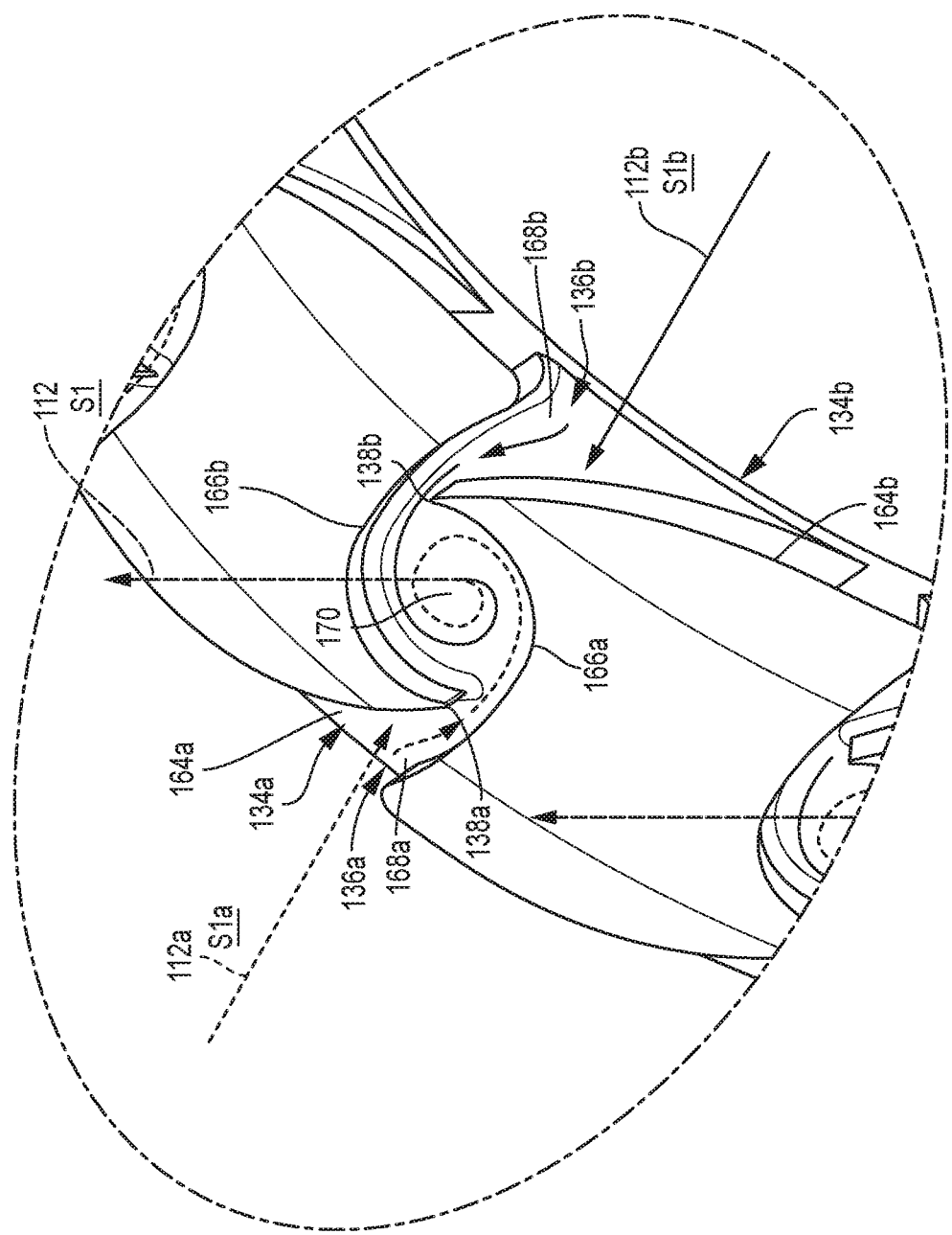

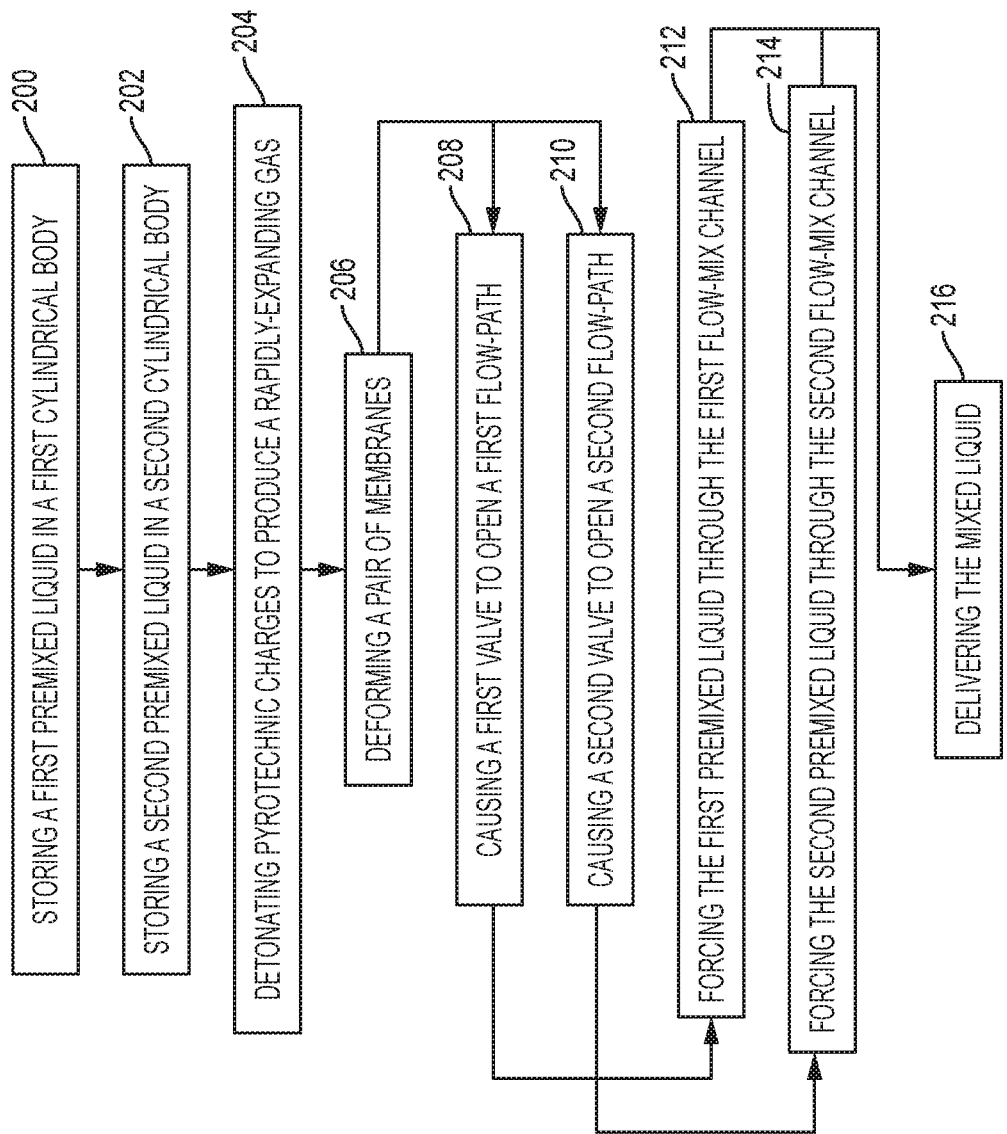

SAFETY DEVICE FOR PREVENTING FUEL COMBUSTION IN AN AUTOMOBILE COLLISION

FIELD OF THE INVENTION

The present invention relates generally to an automobile safety system, and, more particularly, to a system for delivering a chemical substance into fuel of an automobile when a collision occurs.

BACKGROUND OF THE INVENTION

Safety of individuals is a great concern in all industries associated with passengers or travelers. For example, the automobile industry offers products and services that provide protection measures for passengers in case a collision occurs. The protection measures are intended to reduce or eliminate harm to the passengers and damages to the vehicles. Current safety systems, however, are plagued with problems that do not protect passengers in many collisions. One known problem, for example, is associated with the fuel explosion of a ruptured fuel tank that occurs when a collision occurs. The ignited fuel typically causes harm to, and often kills, passengers that would otherwise survive the collision.

An attempt to solve the harmful and damaging effects of a fuel tank explosion has been proposed in the form of a collision-resistant tank that includes an aramid fiber integrated into an impermeable membrane. This approach is problematic at least because the membrane can rupture when in contact with sharp objects, the fuel maintains its flammable state at the time of the collision, and the collision-resistant tank is expensive.

Thus, there is a great need for providing a safety system that solves the above and other problems.

SUMMARY OF THE INVENTION

According to one embodiment of the present disclosure, a safety system for an automobile includes a safety device having a pair of containing areas in which a pair of premixed liquids are stored separately during an initial state of the safety system. The pair of containing areas are in fluid communication with a fuel tank of an automobile. A pair of valves are mounted internally in a central region of the safety device between the pair of containing areas. The pair of valves are closed in the initial state to maintain enclosed and separate the pair of premixed liquids, respectively, in the pair of containing areas. The pair of valves are spaced apart at an initial distance in the initial state and at a triggered distance in a triggered state of the safety system when the pair of valves are open, the initial distance being greater than the triggered distance. A cylindrical ring is mounted in a central location of the safety device near the pair of valves and has a plurality of evacuation holes around its periphery, with each evacuation hole being adjacent to a respective pair of flow-mix channels. The pair of flow-mix channels form a flow-path between the pair of containing areas and a respective evacuation hole via which, in the triggered state, the pair of premixed liquids are forced in a spiral motion and combined into a mixed liquid. The mixed liquid is subsequently expelled through the respective evacuation hole for neutralizing fuel flammability in the fuel tank.

According to another embodiment of the present disclosure, a safety system is directed to preventing fuel explosion in an automobile and includes a fuel tank, a first container having a first storage area in which a first premixed liquid is stored and maintained during an initial state of the safety system, and a second container having a storage area in which a second premixed liquid is stored and maintained during the initial state. The system further includes a ring connecting the first container and the second container at a central region between a first end and a second end, the ring having a plurality of evacuation holes. Each evacuation hole has a respective pair of flow-mix channels, a first flow-mix channel of the pair of flow-mix channels being along a flow-path between the first storage area and the evacuation hole, and a second flow-mix channel of the pair of flow-mix channels being along a flow-path between the second storage area and the evacuation hole. The system also includes a first valve mounted within the ring near the first container for maintaining the first premixed liquid enclosed in the initial state, and a second valve mounted within the ring near the second container for maintaining the second premixed liquid enclosed in the initial state. The first valve and the second valve are movable towards each other in a triggered state of the safety system, the first valve opening a first passage in the triggered state via which the first premixed liquid flows towards the first flow-mix channel, the second valve opening a second passage in the triggered state via which the second premixed liquid flows towards the second flow-mix channel. The first premixed liquid and the second premixed liquid combine into a mixed liquid that is expelled through the respective evacuation hole into the fuel tank for neutralizing fuel flammability.

According to yet another embodiment of the present disclosure, a method is directed to preventing fuel explosion in an automobile and includes storing a first premixed liquid in a first cylindrical body and storing a second premixed liquid in a second cylindrical body. The second premixed liquid is maintained separate from the first premixed liquid during an initial state of a safety system that occurs prior to an automobile collision. In response to determining an imminent occurrence of the automobile collision, pyrotechnic charges are detonated to produce a rapidly-expanding gas. In response to the rapidly-expanding gas, a pair of membranes are deformed to cause inward movement of the pair of membranes towards respective ones of the first premixed liquid and the second premixed liquid. In response to the movement of the pair of membranes, a first valve is caused to open a first flow-path between the first valve and a cylindrical ring that is mounted to the first cylindrical body, the first flow-path continuing through a first flow-mix channel to an evacuation hole. The movement of the pair of membranes further causes a second valve to open a second flow-path between the second valve and the cylindrical ring that is also mounted to the second cylindrical body, the second flow-path continuing through a second flow-mix channel to the evacuation hole. The movement of the pair of membranes forces the first premixed liquid through the first flow-mix channel and into the evacuation hole, and forces the second premixed liquid through the second flow-mix channel and into the evacuation hole where the first premixed liquid and the second premixed liquid are combined into a mixed liquid. The method further includes delivering the mixed liquid into a fuel tank of an automobile in which a combination of the mixed liquid and fuel neutralizes fuel flammability.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 3A is an exploded view showing a cylindrical ring of the safety device of FIG. 2.

FIG. 4A is a representative cross-sectional view along lines "4A-4A" of the safety device of FIG. 2 illustrated in an initial state.

FIG. 4B is a representative cross-sectional view along lines "4B-4B" of the safety device of FIG. 2 illustrated in the initial state.

FIG. 5A is an enlarged view of the respective detail "5A" shown in FIG. 4B.

FIG. 5B is an enlarged view of the respective detail "5B" shown in FIG. 4A.

FIG. 6A shows the safety device of FIG. 4A in an intermediate triggered state.

FIG. 6B shows the safety device of FIG. 4B in the intermediate triggered state.

FIG. 8A shows the safety device of FIG. 4A in a final triggered state.

FIG. 8B shows the safety device of FIG. 4B in the final triggered state.

FIG. 10A is a perspective view of the cylindrical ring of FIG. 3A illustrating mixing and flow of pre-mixed liquids through evacuation holes.

FIG. 10B is a perspective view of an internal band of the cylindrical ring of FIG. 10A illustrating liquid flow in flow-mix channels.

FIG. 10C is an enlarged view of the respective detail "10C" shown in FIG. 10B.

FIG. 11 illustrates a method for preventing fuel explosion in an automobile, according to one embodiment.

Figure 1A:
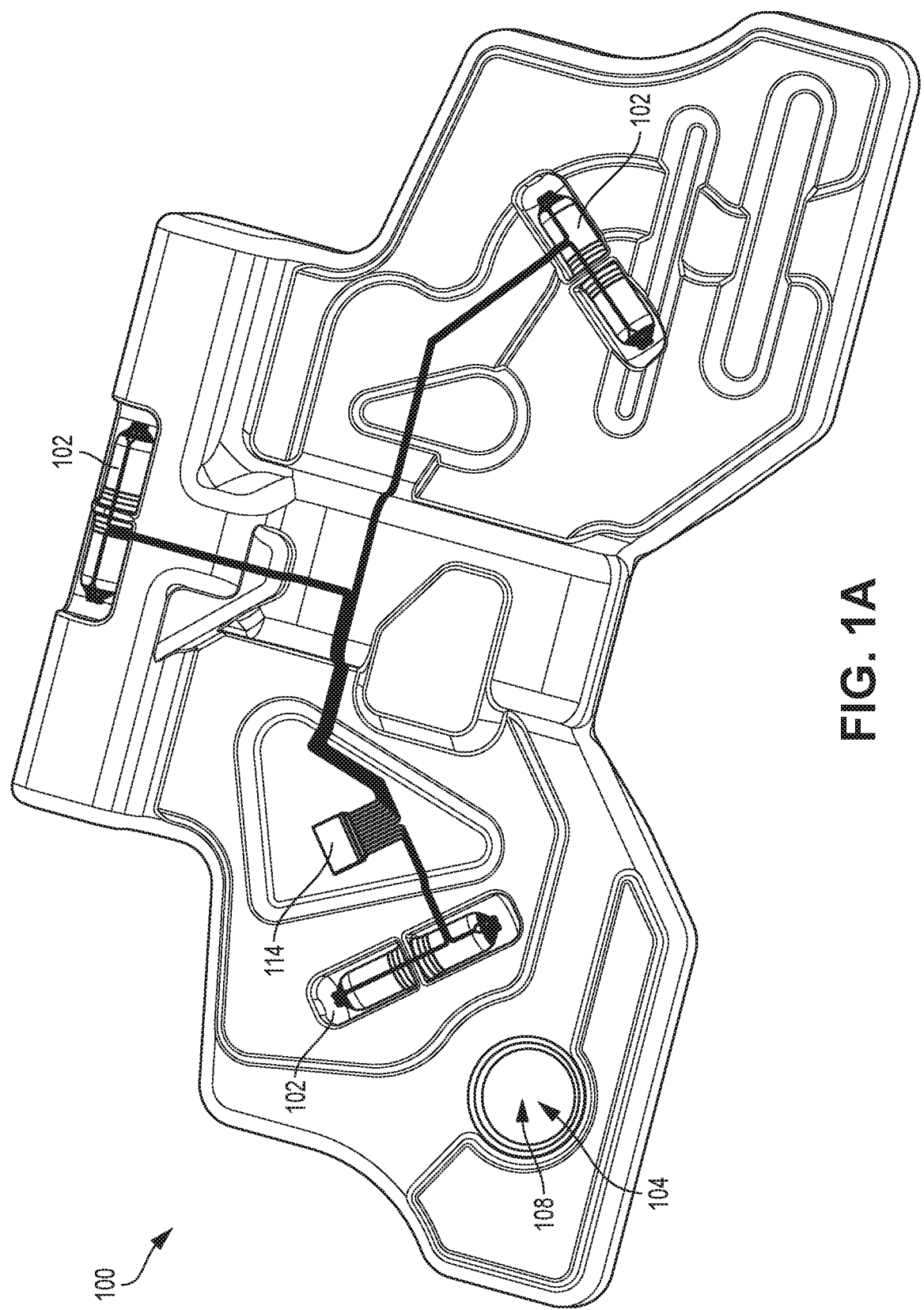
FIG. 1A is a schematic view illustrating a safety system for an automobile with direct spraying of a mixed liquid into a fuel tank.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Referring to FIG. 1A, a safety system 100 for an automobile includes a safety device 102 that is mounted near an automobile fuel tank 104 and that is communicatively coupled with a control system 114. The safety device 102 is in fluid communication with fuel 108 in the fuel tank 104 such that an active chemical solution S1 in the form of a mixed liquid 112 is delivered from the safety device 102 to the fuel tank 104. According to the illustrated exemplary embodiment, the safety device 102 is in direct fluid communication with the fuel tank 104, with the safety device 102 being located internally within the fuel tank 104. Once delivered and combined with the fuel 108, the solution S1 neutralizes fuel flammability and, thus, prevents fuel combustion when a collision occurs. According to one exemplary benefit of the present disclosure, the safety system 100 provides a solution to the mixing of the chemical solution S1 prior to being delivered into the fuel tank 104.

Although the disclosure below describes, for brevity, a single safety device 102, it is understood that a plurality of safety devices 102 can be implemented in the safety system 100. For example, the safety system 100 illustrated in FIG. 1A shows three safety devices 102 that are located strategically within the fuel tank 104 to optimizes delivery and sufficiency of the solution S1 when mixed with the fuel 108.

The safety device 102 is further communicatively coupled to the control system 114 that controls the activation of the safety device 102 when a collision becomes imminent. The control system 114 is further communicatively coupled to a vehicle's control board for monitoring and determined various aspects related to a potential collision, e.g., vehicle speed, vehicle deceleration, etc. The control system 114 determines the moment at which mixing of premixed liquids 112a, 112b (described in more detail below and illustrated, for example, in FIG. 4A) into the mixed liquid 112 and injection of the mixed liquid 112 should occur prior to an inevitable collision to achieve fuel neutralization. Although the mixing of the premixed liquids 112a, 112b occur prior to the collision according to one embodiment, according to an alternative embodiment the mixing occurs during or after the collision, but before the occurrence of a potential fuel explosion.

Figure 1B:
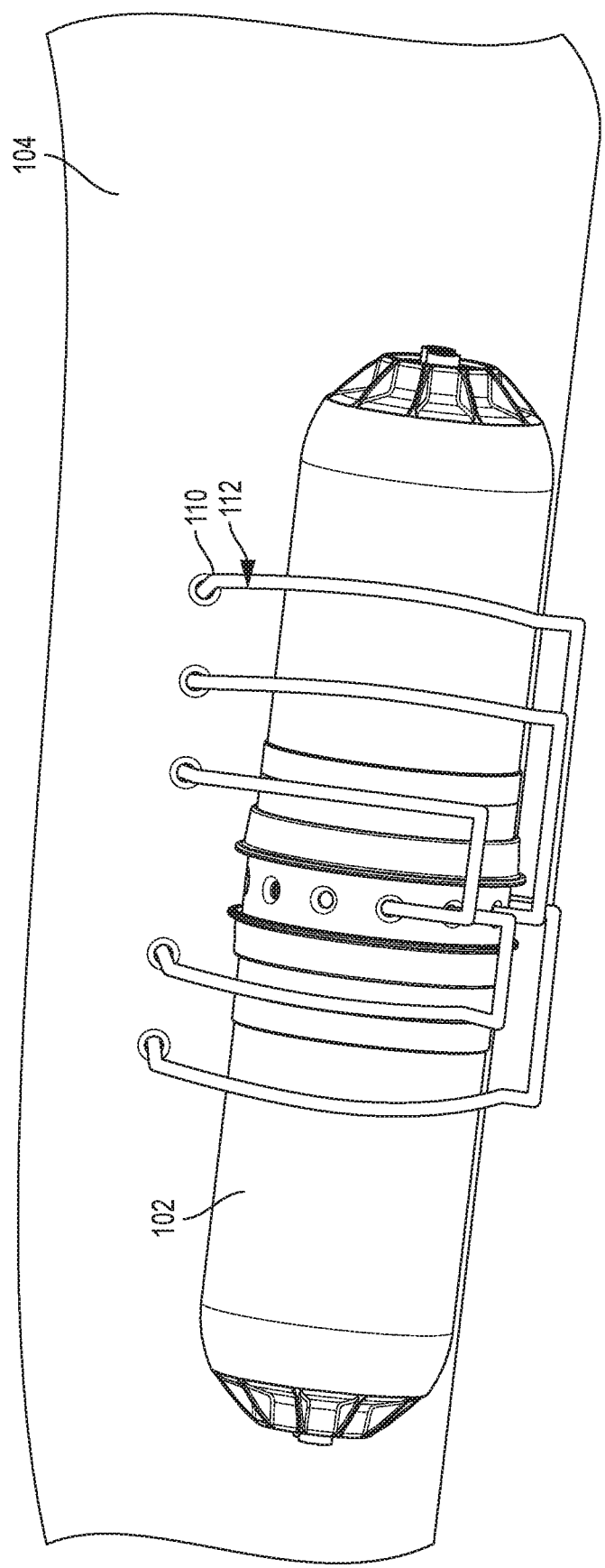
FIG. 1B is a schematic view illustrating another safety system for an automobile with indirect spraying of a mixed liquid into a fuel tank.

Referring to FIG. 1B, according to another embodiment, the safety device 102 is in indirect fluid communication with the fuel tank 104 via a plurality of flow conduits 110 that direct the flow of the mixed liquid 112 from the safety device 102 to the fuel tank 104. In this embodiment, the safety device 102 is mounted externally to or near the fuel tank 104.

Figure 2:
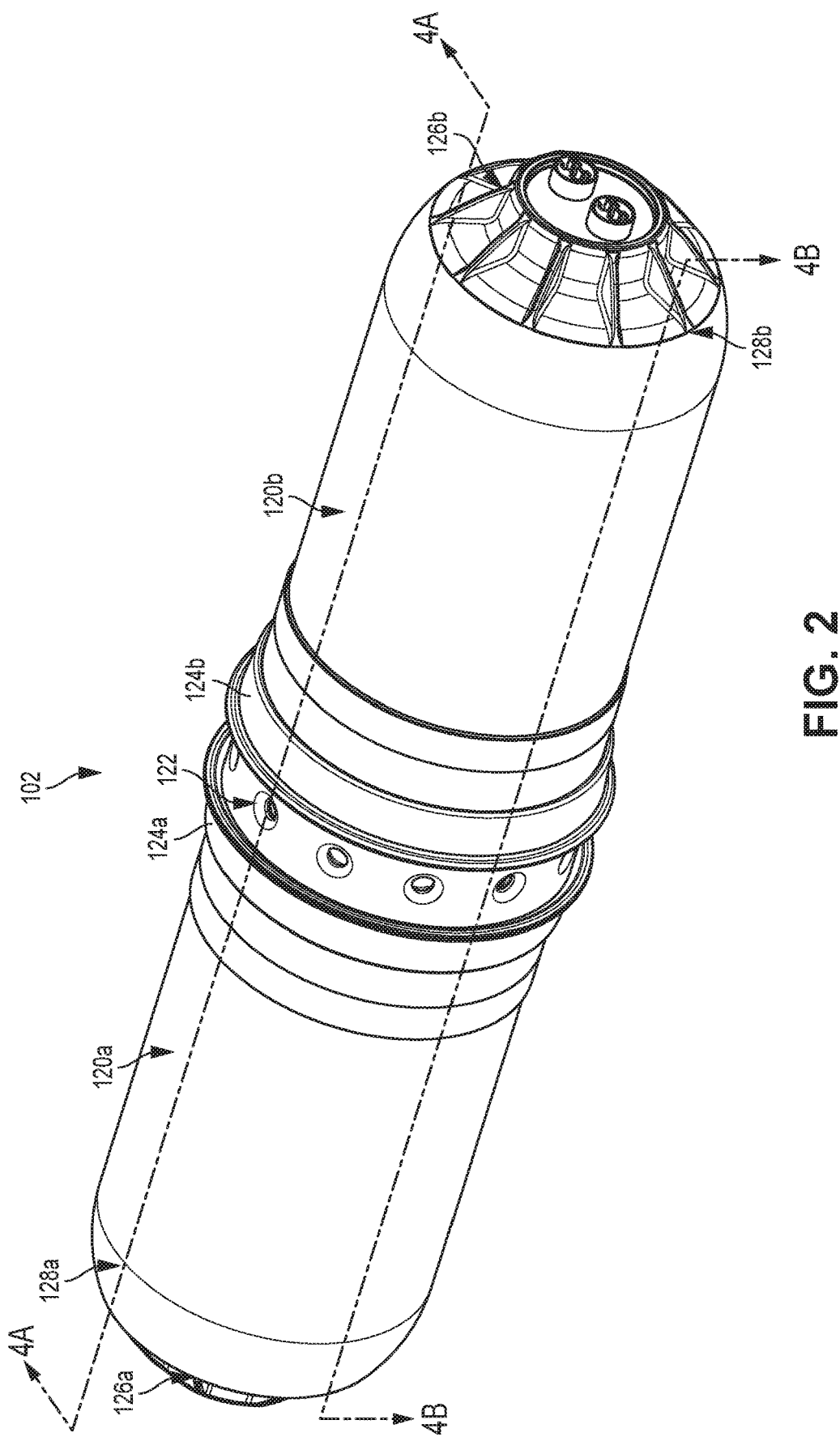
FIG. 2 is a perspective view of a safety device.

Referring to FIG. 2, the safety device 102 is illustrated in accordance with an exemplary embodiment in which two cylindrical bodies 120a, 102b are coupled to each other via a cylindrical ring 122. The safety device 102 is generally a mixing-and-separation device that, as disclosed below in more detail, functions to initially maintain the premixed liquids 112a, 112b separate from each other and, then, in response to a triggering condition activate the mixing and spraying of the mixed liquid 112. Two support rings 124a, 124b are further mounted to fixedly secure with structural rigidity the cylindrical ring 122 to the cylindrical bodies 120a, 120b. Each of the cylindrical bodies 120a, 120b has a pyrotechnic charge 126a, 126b mounted at an end 128a, 128b.

Figure 3B:
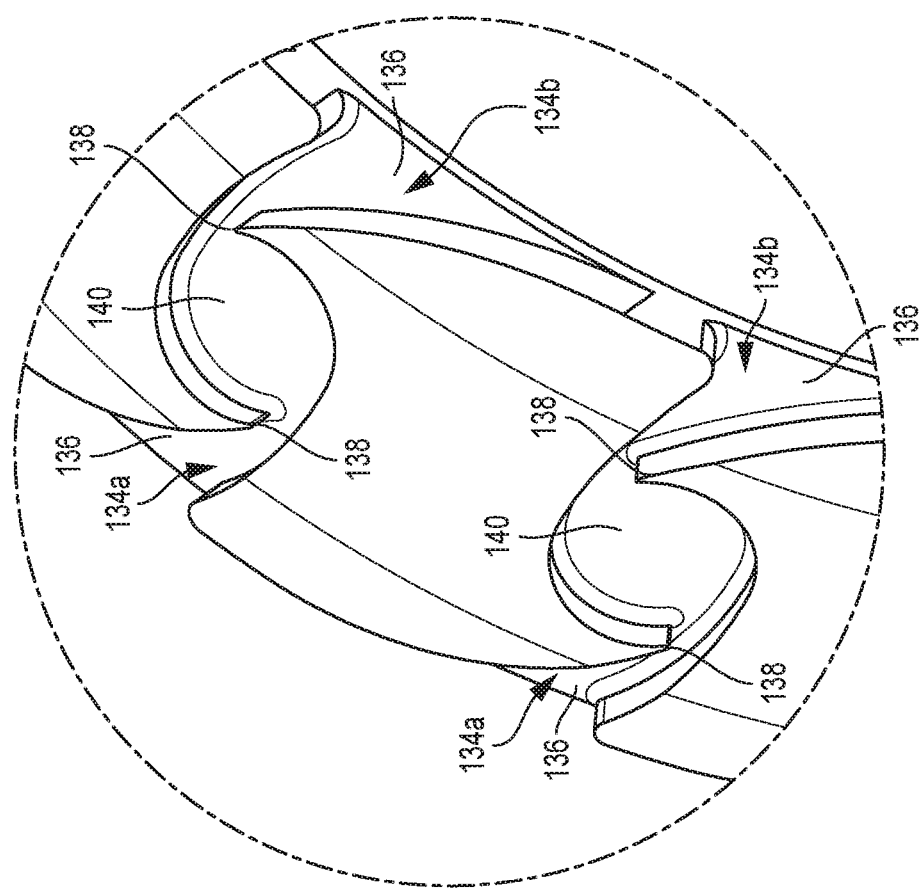
FIG. 3B is an enlarged view of the respective detail "3A" shown in FIG. 3A.
Figure 7B:
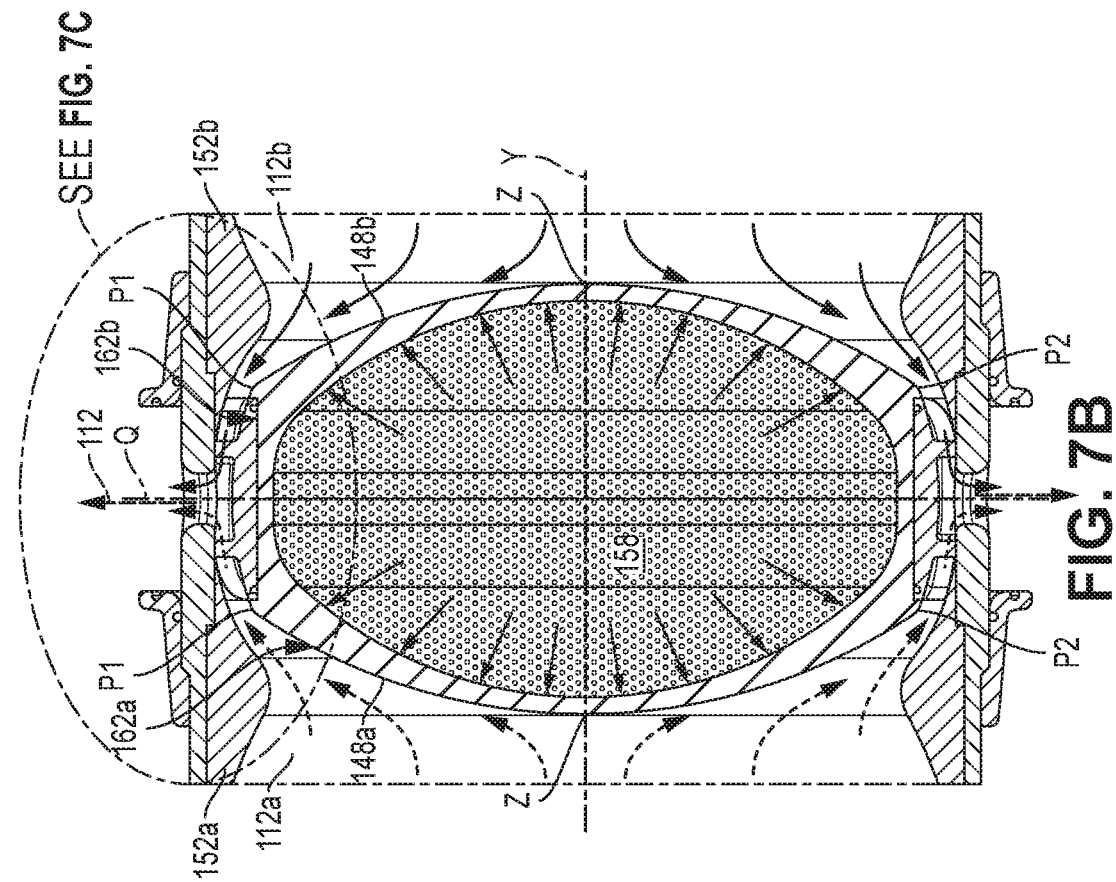
FIG. 7B is an enlarged view of the respective detail "7B" shown in FIG. 6A.
Figure 7A:
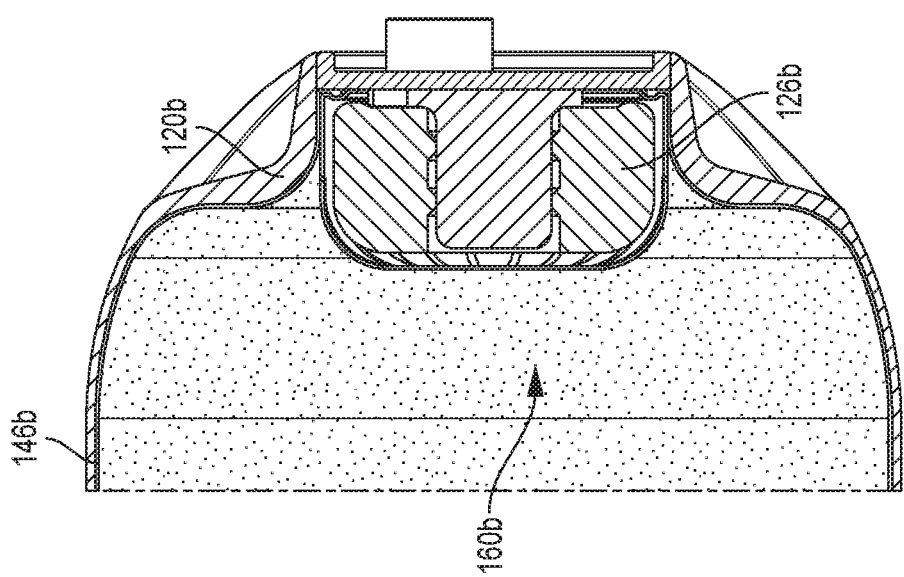
FIG. 7A is an enlarged view of the respective detail "7A" shown in FIG. 6B.
Figure 7C:
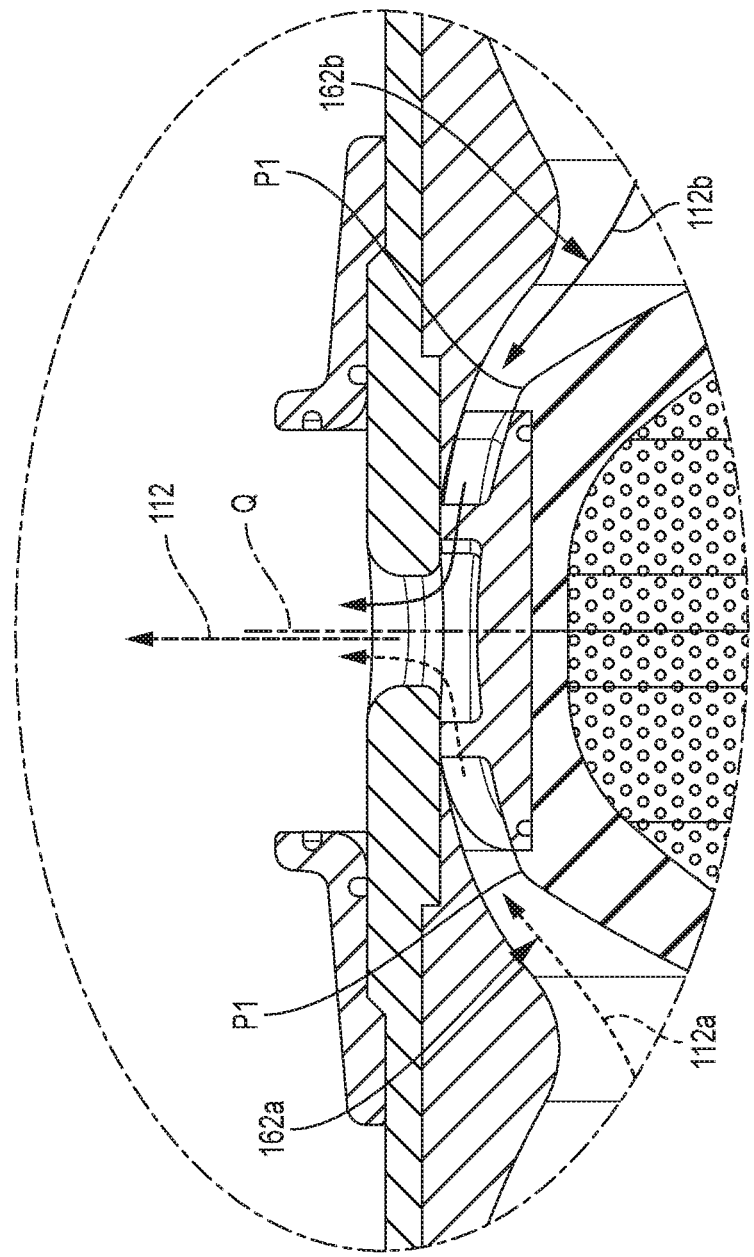
FIG. 7C is an enlarged view of the respective detail "7C" shown in FIG. 7B.
Figure 9B:
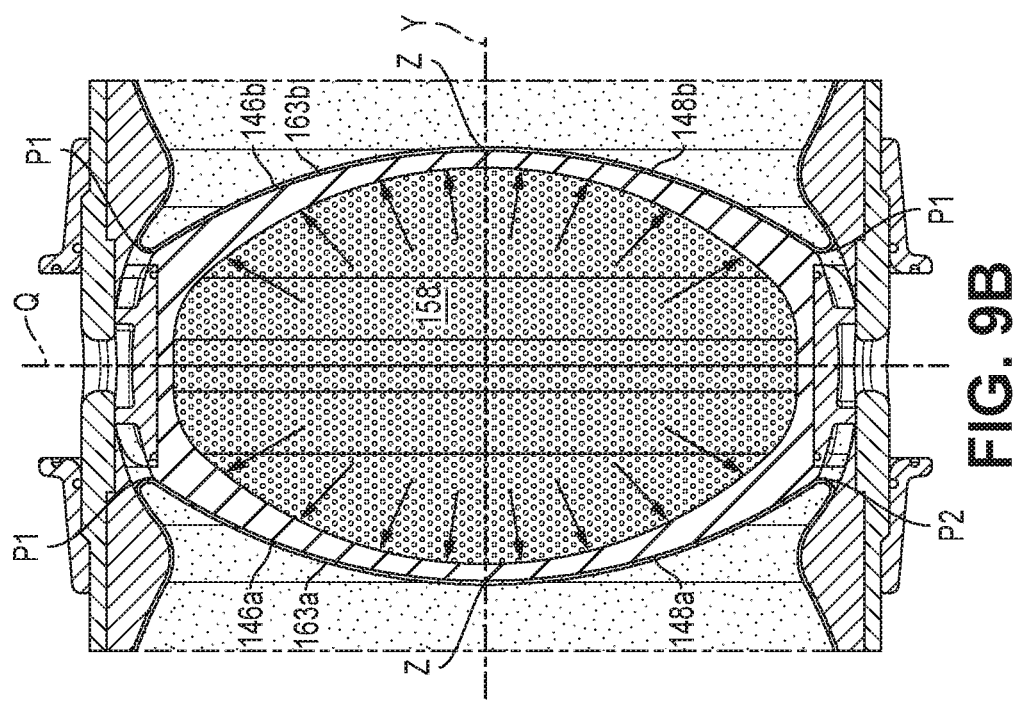
FIG. 9B is an enlarged view of the respective detail "9B" shown in FIG. 8A.
Figure 9A:
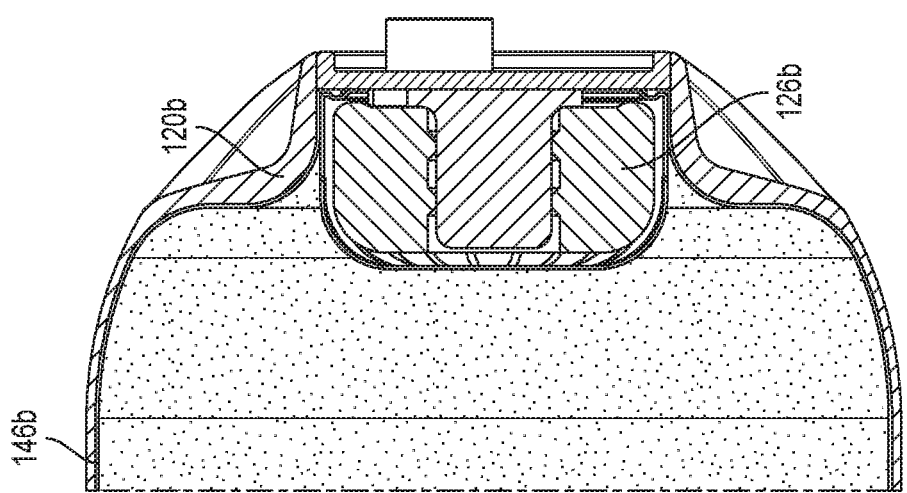
FIG. 9A is an enlarged view of the respective detail "9A" shown in FIG. 8B.

Referring to FIGS. 3A and 3B, the two cylindrical bodes 120a, 120b are generally identical to each other and symmetrically mounted relative to the cylindrical ring 122. For brevity, the disclosure below will focus primarily on one of the cylindrical bodies 120a, 120b (e.g., a first cylindrical body 120a illustrated on the left side of the exemplary configuration), but it is understood that the disclosure also describes, as applicable, the other one of the cylindrical bodies 120b (e.g., a second cylindrical body 120 illustrated on the right side of the exemplary configuration). The first cylindrical body 120a is fixedly mounted to the cylindrical ring 122 via a first support ring 124a. The cylindrical ring 122 is illustrated exposed on the right side, from which the second cylindrical body 120b has been removed for clarity purposes, to further illustrate an internal cylindrical band 130.

The cylindrical ring 122 is mounted in a central location of the safety device 102, between the two cylindrical bodies 120a, 120b, and has a plurality of evacuation holes 132 around its periphery. The number of evacuation holes 132 can vary based on particular flow needs. Although a total of 12 evacuation holes 132 are being illustrated in the present embodiment, the number of evacuation holes 132 can be greater or smaller if the respective goals of flow mixing and dispersing are achieved (e.g., fuel neutralization is achieved in the required response time for the applicable volume). For example, to decrease the time required to combine the mixed liquid 112 with the fuel 108, the number of evacuation holes 132 is increased.

Each of the evacuation holes 132 has an adjacent pair of flow-mix channels 134a, 134b, each of the flow-mix channels 134a, 134b having a curved profile that narrows in size from a channel opening 136 to a channel termination 138 near a mixing chamber 140 beneath the respective evacuation hole 132. Each mixing chamber 140 has a generally circular profile that is generally aligned with the respective evacuation hole 132 such that center points of both the mixing chamber 140 and the respective evacuation hole 132 are generally coincident along radial axis X.

Referring to FIGS. 4A-5B, the safety device 102 is illustrated in an initial state of the safety system 100 in which the chemical solution S1 is separated into two distinct chemical solutions S1a and S1b and which are illustrated respectively in the form of a pair of premixed liquids that consists of the first premixed liquid 112a and the second premixed liquid 112b. In the initial state, the pyrotechnic charges 126a, 126b are in a pre-detonation stage, awaiting the control system 114 to send an activation signal when occurrence of a collision is determined to be imminent.

Each of the pyrotechnic charges 126a, 126b has a socket 142a, 142b that is communicatively (e.g., electrically or wirelessly) coupled to the control system 114. The pyrotechnic charges 126a, 126b, in accordance with one exemplary embodiment, are similar to charges used to deploy air bags in automobiles. According to another example, the pyrotechnic charges 126a, 126b include a metal capsule containing a neutral gas such as carbon dioxide gas. The detonation and expansion of the gas produced by the pyrotechnic charges 126a, 126b occurs in a very short period of time, such as within a fraction of a second.

The first premixed liquid 112a is stored in a first, or left, area of the safety device 102, being maintained within a first containing area 144a of the first cylindrical body 120a between a first deformable membrane 146a and a first valve 148a. The first containing area 144a is hermetically sealed for storing the first premixed liquid 112a. The first deformable membrane 146a is located near and adjacent to the first pyrotechnic charge 126a, overlaying in part with a first inner tubular wall 150a of the first cylindrical body 120a. The first containing area 144a of the first cylindrical body 120a is generally an enclosed storage space defined peripherally by the first tubular wall 150a of the first cylindrical body 120a, the first deformable membrane 146a, and the first valve 148a. In addition to the first valve 148a, the first containing area 144a is further defined in part by a first limiter 152a that is in direct contact with the first valve 148a in the initial state. The first limiter 152a prevents movement of the first valve 148a along a longitudinal axis Y of the safety device 102 in a direction towards the first deformable membrane 146a.

The first valve 148a has a cross-sectional shape that curves inward towards the central region along the longitudinal axis Y of the safety device 102. More specifically, the first valve 148a has an arc shape in which the center of the arc is a point Z that is generally along the longitudinal axis Y and two end points P1 and P2 in contact with the first limiter 152a. The point Z extends further from a symmetry line Q than the end points P1 and P2. Accordingly, the cross-sectional shape of the first valve 148a is also referred-to as being convex, curving outward away from the symmetry line Q of the central region and along the longitudinal axis Y.

A similar, symmetrical, configuration is provided for the second premixed liquid 112b, which is stored in second, or right, area of the safety device 102. Thus, for example, the second premixed liquid 112b is maintained in its own second containing area 144b of the second cylindrical body 120b between its own second membrane 146b and second valve 148b, which is in direct contact with a second limiter 152b. The second containing area 144b is also hermetically sealed for storing the second premixed liquid 112b. The second membrane 146b overlays in part with a second inner tubular wall 150b of the second cylindrical body 120b. Based on the symmetrical configuration, the two valves 148a, 148b and an internal surface 154 of the internal band 130 define an internal area 156 in which a compressible gas 158 maintains the two valves 148a, 148b in their closed position in the initial state.

Referring to FIGS. 6A-7C, the safety device 102 is illustrated in an intermediate triggered state of the safety system 100 in which the imminence of a collision causes the detonation of the two pyrotechnic charges 126a, 126b. In response to the detonation, an explosive gas 160a, 160b causes the deformation of each deformable membrane 146a, 146b, which forces the premixed liquids 112a, 112b, respectively, towards the valves 148a, 148b. The force applied to the premixed liquid 112a, 112b causes, in turn, opening of the valves 148a, 148b, which move towards each other. The movement of the valves 148a, 148b opens a respective flow passage 162a, 162b between the limiters 152a, 152b and the valves 148a, 148b. The opening of the flow passages 162a, 162b allows the first premixed liquid 112a to mix with the second premixed liquid 112b in the mixing chamber 140 of each evacuation hole 132.

The first premixed liquid 112a and the second premixed liquid 112b each follow a flow-path that begins between the respective limiter 152a, 152b and the end points P1 and P2 of the respective valve 148a, 148b at the flow passages 162a, 162b. The flow-path continues through the respective flow-mix channel 134a, 134b, entering in a respective channel opening 136a, 136b and continuing to a respective channel termination 138a, 138b. The flow-path, then, enters the mixing chamber 140 in which the premixed liquids 112a, 112b are combined into the mixed liquid 112. Subsequently, the flow-path exits through the respective evacuation hole 132. A similar flow-path is followed by the premixed liquids 112a, 112b with respect to each of the plurality of evacuation holes 132.

The movement of the valves 148a, 148b compresses the compressible gas 158 internally. Accordingly, the force applied to the premixed liquids 112a, 112b by the deformable membranes 146a, 146b is sufficiently large to overcome the opposite pressure applied by the compressible gas 158 to the valves 148a, 148b in the initial state and which maintains the valves 148a, 148b in the closed position.

Referring to FIGS. 8A-9B, the safety device 102 is illustrated in a final triggered state of the safety system 100 in which the premixed liquids 112a, 112b have been completely expelled from the container areas 144a, 144b. The deformable membranes 146a, 146b are fully expanded and in contact with a respective external surface 163a, 163b of the valves 148a, 148b.

Referring generally to FIGS. 10A-10C, the flow of the premixed liquids 112a, 112b is illustrated in more detail. Generally, as already described above, the first premixed liquid 112a is forced to move from left to right in response to the detonation of the first pyrotechnic charge 126a, which in turn causes deformation of the first deformable membrane 146a, which forces the movement of the first premixed liquid 112a. More specifically referring to FIGS. 10A-10C, as the first premixed liquid 112a escapes through the opening 162a between the first valve 148a and the first limiter 152a, the first premixed liquid 112a enters the first flow-mix channel 134a. Similarly and generally, the second premixed liquid 112b is forced to move from right to left in response to the detonation of the second pyrotechnic charge 126a, which in turn causes deformation of the second deformable membrane 146b, which forces the movement of the second premixed liquid 112b. More specifically, as the second premixed liquid 112a escapes through the opening 162b between the second valve 148b and the second limiter 152b, the second premixed liquid 112b enters the second flow-mix channel 134b. In the illustrated exemplary embodiment, the flow of the premixed liquids 112a, 112b is symmetrical with respect to the symmetry line Q. However, in other embodiments, the flow of the premixed liquids 112a, 112b is different, i.e., not symmetrical.

The flow-mix channels 134a, 134b are shaped such that each channel opening 136a, 136b is greater than the respective channel termination 138a, 138b, creating a funnel effect. Additionally, the flow-mix channels 134a, 134b are further defined by a leading wall 164a, 164b with a curved shape that leads the premixed liquids 112a, 112b from the wider channel opening 136a, 136b towards the respective narrow channel termination 138a, 138b. A back wall 166a, 166b further defines the flow-mix channels 134a, 134b, being positioned in an opposing manner relative to the respective leading wall 164a, 164b and having a curved profile that extends into and defines a portion of the mixing chamber 140. Both the leading wall 164a, 164b, and the back wall 166a, 166b extend from a channel surface 168a, 168b that is contiguous and planar with a chamber surface 170.

As the premixed liquids 112a, 112b are forced into the pair of flow-mix channels 134a, 134b, they are mixed in a spiral motion that causes a centrifugal force, based on the shape and configuration of the flow-mix channels 134a, 134b. The spiral motion results in the formation of the mixed liquid 112, and the centrifugal force results in the mixed liquid 112 being expelled through the evacuation hole 132 for neutralizing fuel flammability in the fuel tank 104. According to one example, the working time from activation to completion of the triggering state is about 0.1 seconds or less.

According to an alternative embodiment, the evacuation holes 132 are in the form of individual jets that spray the mixed liquid 112 directly into the fuel tank 104. Thus, as already disclosed above, in this embodiment the safety device 102 is mounted directly in the fuel tank 104 and does not require the flow conduits 110. Instead, the evacuation holes 132 achieve directly and efficiently dispersal of the mixed liquid 112 directly into the fuel tank 104.

According to some embodiments, the safety system 100 is adapted and configured to for use in all civil, private, and military vehicle models. The shape, size, and weight of the safety system 100, including one or more safety devices 102, are adjustable to comply with applicable limits of the automobile industry. For example, about 1 liter (0.26 gallons) of mixed liquid 112 successfully neutralizes about 100 liters (26 gallons) of fuel 108. If a standard fuel tank 104 for a compact automobile has a capacity of about 60 liters (16 gallons), the safety system 100 requires about 600 milliliters (0.15 gallons) of utility volume (which is about 90% of the storage space for an exemplary safety device 102). In this example, the safety system 100 can include, for example, either a single safety device 102 or three safety devices 102 for an improved result.

According to one embodiment, the safety system 100 is made from various alloys and composite materials that are appropriately sized based on the volume of an applicable fuel tank. For example, the safety device 102 consists of 20% aluminum T6 6061, 20% polyamides, 40% polypropylene, 10% polyethylene, and 10% ceramic.

According to one embodiment, the tubular walls 150a, 150b are treated with a coating that includes liquid ceramics and/or other inert materials. The inert materials include a metallic surface-finish having Iridium or other heavy element, a polymer deposit such as Teflon™, or other finishing materials that are selected for inert reaction with the premixed liquids 112a, 112b. The coating preserves the functionality of the safety device 102 long-term. Although the coating applied to the first tubular wall 150a is the same as the coating applied to the second tubular wall 150b according to one example, in other examples the coating applied to the first tubular wall 150a is different than the coating applied to the second tubular wall 150b. The different coating is selected based on the reactivity and/or corrosion with the respective chemical nature of the first premixed liquid 112a and the second premixed liquid 112b (which are not chemically the same).

According to one embodiment, the mixed liquid 112 includes a number of active chemicals in different soluble formulations. For example, the active chemicals include one or more of about 0.3%-0.9% cesium, about 0.1%-0.6% rutherfordium, about 5.9%-9.1% iodine, about 1.8%-4.6% magnesium, about 15.4%-19.2% hydrogen, about 0.7%-1.9% samarium, about 0.2%-1.5% ruthenium, about 10.5%-15.1% potassium, about 12.6%-16.4% nitrogen, about 7.1%-9.9% phosphorus, and about 30.6%-35.6% perchloric acid.

Referring to FIG. 11, a method for preventing fuel explosion in an automobile includes storing a first premixed liquid in a first cylindrical body at step 200. A second premixed liquid is stored at step 202 in a second cylindrical body, separate from the first premixed liquid. The first and second premixed liquids are stored generally simultaneously during an initial state of a safety that occurs prior to an automobile collision. In response to determining an imminent occurrence of the automobile collision, at step 204, pyrotechnic charges are detonated to produce a rapidly-expanding gas. In response to the rapidly-expanding gas, at step 206, a pair of membranes are deformed to cause inward movement of the pair of membranes towards respective ones of the first premixed liquid and the second premixed liquid.

At step 208, in response to the movement of the pair of membranes, a first valve is caused to open a first flow-path between the first valve and a cylindrical ring that is mounted to the first cylindrical body. The first flow-path continues through a first flow-mix channel to an evacuation hole. At step 210, and generally simultaneously with the opening of the first valve, a second valve is caused to open a second flow-path between the second valve and the cylindrical ring that is also mounted to the second cylindrical body. The second flow-path continues through a second flow-mix channel to the evacuation hole.

At step 212, the first premixed liquid is forced through the first flow-mix channel and into the evacuation hole. At step 214, the second premixed liquid is forced through the second flow-mix channel and into the evacuation hole. In the evacuation hole, the first premixed liquid and the second premixed liquid are combined into a mixed liquid. At step 216, the mixed liquid is delivered, directly and/or indirectly, into a fuel tank of an automobile in which a combination of the mixed liquid and fuel neutralizes fuel flammability.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A safety system for an automobile, the safety system comprising:
    a safety device having a pair of containing areas in which a pair of premixed liquids are stored separately during an initial state of the safety system, the pair of containing areas being in fluid communication with a fuel tank of an automobile;
    a pair of valves mounted internally in a central region of the safety device between the pair of containing areas, the pair of valves being closed in the initial state to maintain enclosed and separate the pair of premixed liquids, respectively, in the pair of containing areas, the pair of valves being spaced apart at an initial distance in the initial state and at a triggered distance in a triggered state of the safety system when the pair of valves are open, the initial distance being greater than the triggered distance; and
    a cylindrical ring mounted in a central location of the safety device near the pair of valves, the cylindrical ring having a plurality of evacuation holes around its periphery with each evacuation hole being adjacent to a respective pair of flow-mix channels, the pair of flow-mix channels forming a flow-path between the pair of containing areas and a respective evacuation hole via which, in the triggered state, the pair of premixed liquids are forced in a spiral motion and combined into a mixed liquid that is subsequently expelled through the respective evacuation hole for neutralizing fuel flammability in the fuel tank.

2. The safety system of claim 1, wherein the safety device includes a first cylindrical body and a second cylindrical body, the first cylindrical body being coupled to the second cylindrical body via the cylindrical ring.

3. The safety system of claim 1, wherein the pair of valves are symmetrically mounted along a longitudinal axis of the safety device.

4. The safety system of claim 3, wherein the pair of valves form a convex cross-sectional shape that curves outward away from the central region and along the longitudinal axis of the safety device.

5. The safety system of claim 1, further comprising a limiter mounted within each of the pair of containing areas for preventing movement of a respective one of the pair of valves towards a respective end of the safety device, the limiter being mounted on an internal surface of the safety device and being in contact with the respective one of the pair of valves in the initial state, the limiter being separated by a gap from the respective one of the pair of valves in the triggered state, the gap leading the respective one of the premixed liquids towards the respective one of the pair of flow-mix channels.

6. The safety system of claim 1, further comprising a pair of deformable membranes including a first membrane mounted near a first end of the safety device and a second membrane near a second end of the safety device, the pair of deformable membranes being undeformed in the initial state, the pair of deformable membranes increasing in volume in the triggered state and causing the pair of valves open.

7. The safety system of claim 6, further comprising a pyrotechnic charge mounted in each of the first end and the second end, the pyrotechnic charge containing an explosive material that detonates in the triggered state in response to receiving a collision signal, the explosive material after detonation forming an expanding gas that deforms and forces the pair of deformable membranes towards the pair of containing areas.

8. The safety system of claim 1, further comprising a pair of support rings fixedly attaching the safety device to the cylindrical ring, the pair of support rings being mounted externally and symmetrically to the cylindrical ring with each support ring being mounted between an external edge of the cylindrical ring and the plurality of evacuation holes.

9. The safety system of claim 1, wherein the pair of valves are separated by a compressible gas within an enclosed space formed by the pair of valves and the cylindrical ring.

10. The safety system of claim 1, further comprising:
    and
    at least one flow conduit between the plurality of evacuation holes and the fuel tank for indirectly inputting the mixed fluid into the fuel tank and combining the mixed fluid with fuel in the fuel tank.

11. The safety system of claim 1, further comprising a control system coupled to the safety device and configured to cause the change from the initial state to the triggered state based on collision input of an automobile.

12. The safety system of claim 1, wherein one or more of the safety device, the pair of valves, and the cylindrical ring consist of materials selected from a group consisting of aluminum, polyamides, polypropylene, polyethylene, and ceramic.

13. A safety system for preventing fuel explosion in an automobile, the safety system comprising:
    a fuel tank;
    a first container having a first storage area in which a first premixed liquid is stored and maintained during an initial state of the safety system;
    a second container having a storage area in which a second premixed liquid is stored and maintained during the initial state;
    a ring connecting the first container and the second container at a central region between a first end and a second end, the ring having a plurality of evacuation holes with each evacuation hole having a respective pair of flow-mix channels, a first flow-mix channel of the pair of flow-mix channels being along a flow-path between the first storage area and the evacuation hole, a second flow-mix channel of the pair of flow-mix channels being along a flow-path between the second storage area and the evacuation hole;

a first valve mounted within the ring near the first container for maintaining the first premixed liquid enclosed in the initial state; and a second valve mounted within the ring near the second container for maintaining the second premixed liquid enclosed in the initial state, the first valve and the second valve being movable towards each other in a triggered state of the safety system, the first valve opening a first passage in the triggered state via which the first premixed liquid flows towards the first flow-mix channel, the second valve opening a second passage in the triggered state via which the second premixed liquid flows towards the second flow-mix channel, the first premixed liquid and the second premixed liquid combining into a mixed liquid that is expelled through the respective evacuation hole into the fuel tank for neutralizing fuel flammability.

14. The safety system of claim 13, wherein the first container and the second container are identical, cylindrically-shaped tanks.

15. The safety system of claim 13, wherein the first container has a first pyrotechnic element and a first deformable membrane mounted at a first end, the second container having a second pyrotechnic element and a second deformable membrane mounted at a second end, the triggered state being responsive to detonation of the first pyrotechnic element and of the second pyrotechnic element, the detonation causing deformation of the first deformable membrane and the second deformable membrane.

16. A method for preventing fuel explosion in an automobile, the method comprising:

storing a first premixed liquid in a first cylindrical body;

storing a second premixed liquid in a second cylindrical body, the second premixed liquid being separate from the first premixed liquid during an initial state of a safety system that occurs prior to an automobile collision;

in response to determining an imminent occurrence of the automobile collision, detonating pyrotechnic charges to produce a rapidly-expanding gas;

in response to the rapidly-expanding gas, deforming a pair of membranes to cause inward movement of the pair of membranes towards respective ones of the first premixed liquid and the second premixed liquid;

in response to the movement of the pair of membranes, causing a first valve to open a first flow-path between the first valve and a cylindrical ring that is mounted to the first cylindrical body, the first flow-path continuing through a first flow-mix channel to an evacuation hole, causing a second valve to open a second flow-path between the second valve and the cylindrical ring that is also mounted to the second cylindrical body, the second flow-path continuing through a second flow-mix channel to the evacuation hole, forcing the first premixed liquid through the first flow-mix channel and into the evacuation hole, forcing the second premixed liquid through the second flow-mix channel and into the evacuation hole where the first premixed liquid and the second premixed liquid are combined into a mixed liquid;

delivering the mixed liquid into a fuel tank of an automobile in which a combination of the mixed liquid and fuel neutralizes fuel flammability.

17. The method of claim 16, further comprising moving the first valve and the second valve towards each other when causing the first valve and the second valve to open.

18. The method of claim 16, further comprising causing the first valve and the second valve to open simultaneously.

19. The method of claim 16, further comprising, in response to the forcing of the first premixed liquid through the first flow-mix channel and the second premixed liquid through the second flow-mix channel, achieving a spiral motion that results in a centrifugal force in the evacuation channel.

20. The method of claim 16, further comprising receiving a collision input from a control system when determining the imminent occurrence of the automobile collision.

* * * * *